US011884063B2

(12) United States Patent
Chechik et al.

(10) Patent No.: US 11,884,063 B2
(45) Date of Patent: Jan. 30, 2024

(54) FRICTION REDUCTION SYSTEM AND METHOD

(71) Applicant: LANDA CORPORATION LTD., Rehovot (IL)

(72) Inventors: Helena Chechik, Rehovot (IL); Shoham Livaderu, Moshav Sitriyya (IL); Matan Bar-On, Hod Hasharon (IL); Zohar Goldenstein, Nes Ziona (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/117,423

(22) Filed: Mar. 4, 2023

(65) Prior Publication Data

US 2023/0278328 A1 Sep. 7, 2023

Related U.S. Application Data

(63) Continuation of application No. 17/694,702, filed on Mar. 15, 2022, now Pat. No. 11,623,440, which is a (Continued)

(51) Int. Cl.

*B41J 2/01* (2006.01)
*B41J 2/21* (2006.01)
*B41J 11/00* (2006.01)

(52) U.S. Cl.

CPC ............... *B41J 2/01* (2013.01); *B41J 2/2103* (2013.01); *B41J 11/005* (2013.01); *B41J 2002/012* (2013.01); *B41P 2213/46* (2013.01)

(58) Field of Classification Search

CPC .. B41M 5/508; B41J 2002/012; B41J 2/0057; B41J 11/007; B41J 15/04; B41J 2/01; B41J 2/2103

See application file for complete search history.

(56) References Cited

U.S. PATENT DOCUMENTS 3,837,878 A 9/1974 Beers
3,935,055 A 1/1976 Carmien
(Continued)

FOREIGN PATENT DOCUMENTS

CN 1961015 A 5/2007
CN 101096455 A 1/2008
(Continued)

OTHER PUBLICATIONS

CN101096455A Machine Translation (EPO, PlatPat and Google) published on Jan. 2, 2008 Fujifilm Corp.
(Continued)

*Primary Examiner* — John Zimmermann
(74) *Attorney, Agent, or Firm* — Momentum IP; Marc Van Dyke

(57) ABSTRACT

A friction reduction system for reducing friction of an intermediate transfer member (ITM) of a printing system, while the ITM is guided along the printing system by a guiding arrangement. The friction reduction system includes a fluid reservoir mounted within the printing system, a fluid depositing arrangement disposed along the ITM, and a control mechanism, adapted to control depositing of fluid, from the fluid depositing arrangement onto the guiding arrangement or onto at least a portion of the ITM. Depositing of the fluid reduces friction between the ITM and the guiding arrangement.

15 Claims, 7 Drawing Sheets

Related U.S. Application Data continuation of application No. 17/279,539, filed as application No. PCT/IB2019/058380 on Oct. 2, 2019, now Pat. No. 11,318,734.

(60) Provisional application No. 62/742,531, filed on Oct. 8, 2018.

(56) References Cited

U.S. PATENT DOCUMENTS

| | | | |
|---|---|---|---|
| 4,204,471 | A | 5/1980 | Becker |
| 4,520,048 | A | 5/1985 | Ranger |
| 4,792,473 | A | 12/1988 | Vitale |
| 4,867,830 | A | 9/1989 | Chung |
| 5,278,199 | A | 1/1994 | Ohkawa et al. |
| 5,757,390 | A | 5/1998 | Gragg et al. |
| 10,703,093 | B2 | 7/2020 | Karlinski et al. |
| 11,623,440 | B2 | 4/2023 | Chechik et al. |
| 11,628,674 | B2 | 4/2023 | Landa et al. |
| 2002/0061451 | A1 | 5/2002 | Kita et al. |
| 2003/0103126 | A1* | 6/2003 | Pham ........ B41J 29/17 347/104 |
| 2003/0103128 | A1 | 6/2003 | Missell et al. |
| 2004/0177779 | A1 | 9/2004 | Steffen et al. |
| 2004/0221943 | A1 | 11/2004 | Yu et al. |
| 2004/0249327 | A1 | 12/2004 | Sendijarevic et al. |
| 2004/0265016 | A1 | 12/2004 | Kitani et al. |
| 2005/0103437 | A1 | 5/2005 | Carroll |
| 2005/0117859 | A1 | 6/2005 | Suzuki et al. |
| 2006/0066704 | A1 | 3/2006 | Nishida |
| 2007/0025740 | A1 | 2/2007 | Katoh et al. |
| 2008/0066277 | A1 | 3/2008 | Colson et al. |
| 2008/0247780 | A1 | 10/2008 | Hara |
| 2009/0073222 | A1 | 3/2009 | Hori |
| 2010/0035501 | A1 | 2/2010 | Prudhomme et al. |
| 2010/0123752 | A1 | 5/2010 | Eun et al. |
| 2011/0069129 | A1 | 3/2011 | Shimizu |
| 2012/0014726 | A1 | 1/2012 | Sekihara et al. |
| 2012/0236100 | A1 | 9/2012 | Toya |
| 2012/0249630 | A1 | 10/2012 | Bugner et al. |
| 2013/0229457 | A1 | 9/2013 | Yu |
| 2013/0235139 | A1 | 9/2013 | Schnabel et al. |
| 2014/0168313 | A1 | 6/2014 | Ramesh et al. |
| 2014/0176641 | A1 | 6/2014 | Hawryschuk et al. |
| 2015/0273835 | A1 | 10/2015 | Arimizu et al. |
| 2015/0343797 | A1 | 12/2015 | Song et al. |
| 2015/0375474 | A1 | 12/2015 | DeGolier et al. |
| 2015/0375543 | A1 | 12/2015 | Barnett et al. |
| 2016/0083609 | A1 | 3/2016 | Sisler et al. |
| 2021/0055666 | A1 | 2/2021 | Landa et al. |
| 2021/0070038 | A1* | 3/2021 | Pomerantz ........ B41J 2/01 |
| 2022/0379598 | A1 | 12/2022 | Landa et al. |
| 2022/0388315 | A1 | 12/2022 | Landa et al. |
| 2023/0001710 | A1 | 1/2023 | Landa et al. |
| 2023/0016492 | A1 | 1/2023 | Landa et al. |
| 2023/0037462 | A1 | 2/2023 | Burkatovsky |

FOREIGN PATENT DOCUMENTS

| | | | |
|---|---|---|---|
| CN | 101248146 | A | 8/2008 |
| CN | 102341249 | A | 2/2012 |
| CN | 107879147 | A | 4/2018 |
| EP | 0953450 | A1 | 11/1999 |
| JP | 48043941 | | 12/1973 |
| JP | S63274572 | A | 11/1988 |
| JP | H05249870 | A | 9/1993 |
| JP | H09174646 | A | 7/1997 |
| JP | H10130597 | A | 5/1998 |
| JP | 2000094660 | A | 4/2000 |
| JP | 2000141883 | A | 5/2000 |
| JP | 2000190468 | A | 7/2000 |
| JP | 2000337464 | A | 12/2000 |
| JP | 2003227549 | A | 8/2003 |
| JP | 2004117118 | A | 4/2004 |
| JP | 2005017472 | A | 1/2005 |
| JP | 2005224737 | A | 8/2005 |
| JP | 2006256087 | A | 9/2006 |
| JP | 2009154377 | A | 7/2009 |
| JP | 2009227909 | A | 10/2009 |
| JP | 2009271422 | A | 11/2009 |
| JP | 2009279808 | A | 12/2009 |
| JP | 2011168024 | A | 9/2011 |
| JP | 2013104044 | A | 5/2013 |
| JP | 2014008609 | A | 1/2014 |
| JP | 2014073675 | A | 4/2014 |
| JP | 2015202616 | A | 11/2015 |
| JP | 2016074206 | A | 5/2016 |
| JP | 2016179678 | A | 10/2016 |
| JP | 2017093178 | A | 5/2017 |
| JP | 2018017429 | A | 2/2018 |
| JP | 2020014350 | A | 1/2020 |
| WO | 2015026864 | A1 | 2/2015 |
| WO | 2017208152 | A1 | 12/2017 |

OTHER PUBLICATIONS

CN101248146A Machine Translation (EPO, PlatPat and Google) published on Aug. 20, 2008 Ricoh KK.
CN102341249A Machine Translation (EPO, PlatPat and Google) published on Feb. 1, 2012 Eastman Kodak Co.
CN107879147A Machine Translation (by EPO and Google)—published Apr. 6, 2018; Brother IND Ltd.
CN1961015A Machine Translation (EPO, PlatPat and Google) published on May 9, 2007 Dainippon Ink & Chemicals.
Co-pending U.S. Appl. No. 18/137,127, filed Apr. 20, 2023.
IP.com search (Year: 2022).
JP2000094660A Machine Translation (by EPO and Google)—published Apr. 4, 2000; Brother IND Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother IND Ltd.
JP2000337464A Machine Translation (by EPO and Google)—published Dec. 5, 2000; Fuji Xerox Co Ltd.
JP2003227549A Machine Translation (by EPO, PlatPat and Google)—published Aug. 15, 2003; Xerox Corp.
JP2004117118A Machine Translation (by EPO and Google)—published Apr. 15, 2004; NIDEC COPAL Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing SYS Ltd.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 SEIKO EPSON Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; RINNAI KK.

(56) References Cited

OTHER PUBLICATIONS

JP2020014350A Machine Translation (by EPO and Google)—published Jan. 23, 2020; Toshiba Mitsubishi Elec IND.
JP48043941 Machine Translation (by EPO and Google)—published Dec. 21, 1973;.
JPH05249870A Machine Translation (by EPO, PlatPat and Google)—published Sep. 28, 1993; Matsushita Electric IND Co Ltd.
JPH09174646A Machine Translation (by EPO and Google)—published Jul. 8, 1997; KAO Corp.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.

* cited by examiner

FRICTION REDUCTION SYSTEM AND METHOD

CROSS-REFERENCE TO RELATED APPLICATIONS

PCT/IB2019/058380 filed on Oct. 2, 2019 is incorporated by reference in its entirety.

FIELD OF THE INVENTION

The present disclosure relates to an intermediate transfer member (ITM) used in a printing system in which liquid ink droplets are deposited at an image forming station onto a movable ITM and transferred at an impression station from the ITM onto a printing substrate. Specifically, this disclosure pertains to a system and a method for reducing friction between the ITM and a guiding arrangement through which the ITM is guided along the printing system between the image forming station and the impression station.

SUMMARY OF THE INVENTION

The invention, in some embodiments, relates to a friction reduction system for reducing friction of an ITM of a printing system, while the ITM is guided along the printing system by a guiding arrangement.

The invention, in some embodiments, relates to a printing system including a friction reduction system for reducing friction between the ITM of the printing system and the guiding arrangement through which the ITM is guided. The invention, in some embodiments, relates to a method for reducing friction between an ITM in a printing system and a guiding arrangement through which the ITM is guided along the printing system As is discussed in greater detail hereinbelow, a friction reduction system according to the present invention includes a fluid reservoir, and a fluid depositing arrangement. Fluid is deposited from the fluid depositing arrangement onto the guiding arrangement or onto the ITM, typically at an area of contact therebetween, thereby to reduce the friction between the ITM and the guiding arrangement. The depositing of fluid by the fluid depositing arrangement is controlled by a control mechanism, such that fluid is deposited periodically, continuously, and/or intermittently.

There is thus provided, in accordance with an embodiment of a first aspect of the invention, a friction reduction system for reducing friction between an intermediate transfer member (ITM) of a printing system and a guiding arrangement of the printing system, while the ITM is guided along the printing system by the guiding arrangement, the friction reduction system including:

- a fluid reservoir mounted within the printing system;
- a fluid depositing arrangement disposed at at least one position along the ITM; and
- a control mechanism, adapted to control depositing of fluid, from the fluid depositing arrangement onto the guiding arrangement or onto at least a portion of the ITM, wherein depositing of the fluid reduces friction between the ITM and the guiding arrangement.

In some embodiments, the control mechanism is adapted to control deposition of fluid from the fluid depositing arrangement onto the ITM at a contact area between the ITM and the guiding arrangement.

In some embodiments, the fluid depositing arrangement includes at least one fluid depositing nozzle.

In some embodiments, the guiding arrangement includes a pair of guiding tracks, such that lateral ends of the ITM are disposed within the guiding tracks and are guided therealong.

In some embodiments, the control mechanism is adapted to control the fluid depositing arrangement such that the fluid is continuously deposited onto the guiding arrangement or onto the at least a portion of the ITM. In some embodiments, the control mechanism is adapted to control the fluid depositing arrangement such that the fluid is continuously deposited at a fixed continuous fluid deposition rate. In some embodiments, the fixed continuous fluid deposition rate is in the range of 1 ml to 50 mL, per hour.

In some embodiments, the control mechanism is adapted to control the fluid depositing arrangement such that fluid is periodically deposited from the fluid depositing arrangement onto the guiding arrangement or onto the at least a portion of the ITM. In some embodiments, the control mechanism is adapted to control the fluid depositing arrangement such that a fixed volume of the fluid is deposited at least every 5 minutes, at least every 10 minutes, at least every 15 minutes, at least every 30 minutes, or at least every 45 minutes. In some embodiments, the fixed volume is in the range of 1 ml to 50 ml.

In some embodiments, the control mechanism is adapted to control the fluid depositing arrangement such that fluid is intermittently deposited from the fluid depositing arrangement onto the guiding arrangement or onto the at least a portion of the ITM.

In some embodiments, the control mechanism is adapted to control the fluid depositing arrangement to deposit fluid in response to the identification of an increase in friction between the ITM and the guiding arrangement. In some embodiments, the control mechanism is adapted to identify an increase in electrical current in the printing system, thereby to identify the increase in friction.

In some embodiments, the control mechanism is adapted to control the fluid depositing arrangement to deposit fluid in response to the identification of an increase in temperature of the ITM or of the guiding arrangement at a region of interface between the ITM and the guiding arrangement.

In some embodiments, the control mechanism is functionally associated with a user interface, and is adapted to control the fluid depositing arrangement to deposit fluid in response to receipt of a corresponding user instruction.

In some embodiments, the fluid depositing arrangement includes a plurality of pre-defined fluid depositing locations at which fluid can be deposited onto the guiding arrangement or onto the at least a portion of the ITM, and wherein the control mechanism is adapted to control the fluid depositing arrangement such that fluid is deposited at a specific one of the plurality of pre-defined fluid depositing locations.

In some embodiments, the fluid deposited onto the guiding arrangement or onto the at least a portion of the ITM is adapted to reduce friction by reducing at least a local temperature of at least a portion of the ITM or of at least a portion of the guiding arrangement, at a region of engagement between the ITM and the guiding arrangement. In some embodiments, the fluid is water. In some embodiments, the fluid is pressurized air.

In some embodiments, the fluid deposited onto the guiding arrangement or onto the at least a portion of the ITM is adapted to reduce friction by lubricating a contact area of the ITM and the guiding arrangement.

In some embodiments, the fluid includes an aqueous emulsion. In some embodiments, the emulsion includes at least 70% water, at least 75% water, at least 80% water, at least 85% water, at least 90% water, or at least 95% water. In some embodiments, the emulsion includes at most 30% lubricant, at most 25% lubricant, at most 20% lubricant, at most 15% lubricant, at most 10% lubricant, or at most 5% lubricant. In some embodiments, the emulsion includes 80% water and 10% lubricant.

In some embodiments, the lubricant includes pure silicone.

In some embodiments, the lubricant does not detrimentally affect printing quality or characteristics of the ITM.

In some embodiments, the ITM includes a seam, and, under fixed testing conditions, a force at which seam failure occurs, following deposition onto the ITM of the lubricant at a rate of 10 cc of fluid per hour for a duration of 72 hours, is smaller than a force at which seam failure occurs prior to deposition of the lubricant, by at most 30%, at most 25%, at most 20%, at most 15%, at most 10%, or at most 5%.

In some embodiments, the ITM includes a pair of laterally extending guiding formations along lateral edges of the ITM, which guiding formations extend through the guiding arrangement. In some embodiments, under fixed testing conditions, a peeling force at which failure occurs between the guiding formations and the lateral edges of the ITM, following deposition onto the ITM of the lubricant at a rate of 10 cc per hour for a duration of 72 hours, is smaller than a peeling force at which such failure occurred prior to deposition of the lubricant by at most 35%, at most 30%, at most 25%, at most 20%, at most 15%, at most 10%, or at most 5%.

In some embodiments, under fixed testing conditions, a spring constant of the guiding formations measured following deposition onto the ITM of the lubricant at a rate of 10 cc per hour for a duration of 72 hours, differs from a spring constant of the guiding formations measured prior to deposition of the lubricant by at most 15%, at most 10%, or at most 5%.

In some embodiments, the lubricant is further adapted to clean the guiding arrangement.

In some embodiments, the lubricant is chemically stable at a temperature at which the fluid is stored in the printing system. In some embodiments, the lubricant is chemically stable at least at a temperature in the range of 5 to 40 degrees Celsius.

In some embodiments, the fluid depositing arrangement includes a first fluid depositing nozzle disposed at a first location on a first side of the guiding arrangement, and a second fluid depositing nozzle disposed above a second location on a second side of the guiding arrangement, the first and second fluid depositing nozzles being functionally associated with the control mechanism. In some embodiments, the second location is substantially parallel to the first location.

In some embodiments, the friction reduction system further includes a pumping arrangement, in fluid flow communication with the fluid reservoir and the fluid depositing arrangement, the pumping arrangement adapted to pump fluid from the reservoir to the fluid depositing arrangement.

There is further provided, in accordance with an embodiment of a second aspect of the invention, a printing system including:

- an intermediate transfer member (ITM) formed as an endless belt;
- an image forming station at which droplets of an ink are applied to an outer surface of the ITM to form an ink image;
- a drying station for drying the ink image to leave an ink residue film;
- an impression station at which the residue film is transferred to a substrate;
- a guiding arrangement, having lateral edges of the ITM guided therealong for guiding the ITM from the image forming station, via the drying station, to the impression station; and
- a friction reduction system for reducing friction between the ITM and the guiding arrangement while the ITM is guided along the guiding arrangement, the friction reduction system including:
  - a fluid reservoir mounted within the printing system;
  - a fluid depositing arrangement, disposed at at least one position along the ITM; and
  - a control mechanism, adapted to control depositing of fluid, from the fluid depositing arrangement onto the guiding arrangement or onto at least a portion of the ITM.

In some embodiments, the control mechanism is adapted to control deposition of fluid from the fluid depositing arrangement onto the ITM at a contact area between the ITM and the guiding arrangement.

In some embodiments, the fluid depositing arrangement includes at least one fluid depositing nozzle.

In some embodiments, the guiding arrangement includes a pair of guiding tracks, such that lateral ends of the ITM are disposed within the guiding tracks and are guided therealong.

In some embodiments, the control mechanism is adapted to control the fluid depositing arrangement such that the fluid is continuously deposited onto the guiding arrangement or onto the at least a portion of the ITM. In some embodiments, the control mechanism is adapted to control the fluid depositing arrangement such that the fluid is continuously deposited at a fixed continuous fluid deposition rate. In some embodiments, the fixed continuous fluid deposition rate is in the range of 1 ml to 50 ml, per hour.

In some embodiments, the control mechanism is adapted to control the fluid depositing arrangement such that fluid is periodically deposited from the fluid depositing arrangement onto the guiding arrangement or onto the at least a portion of the ITM. In some embodiments, the control mechanism is adapted to control the fluid depositing arrangement such that a fixed volume of the fluid is deposited at least every 5 minutes, at least every 10 minutes, at least every 15 minutes, at least every 30 minutes, or at least every 45 minutes. In some embodiments, the fixed volume is in the range of 1 ml to 50 ml.

In some embodiments, the control mechanism is adapted to control the fluid depositing arrangement such that fluid is intermittently deposited from the fluid depositing arrangement onto the guiding arrangement or onto the at least a portion of the ITM.

In some embodiments, the control mechanism is adapted to control the fluid depositing arrangement to deposit fluid in response to the identification of an increase in friction between the ITM and the guiding arrangement. In some embodiments, the control mechanism is adapted to identify an increase in electrical current in the printing system, thereby to identify the increase in friction.

In some embodiments, the control mechanism is adapted to control the fluid depositing arrangement to deposit fluid in response to the identification of an increase in temperature of the ITM or of the guiding arrangement at a region of interface between the ITM and the guiding arrangement.

In some embodiments, the control mechanism is functionally associated with a user interface, and is adapted to control the fluid depositing arrangement to deposit fluid in response to receipt of a corresponding user instruction.

In some embodiments, the fluid depositing arrangement includes a plurality of pre-defined fluid depositing locations at which fluid can be deposited onto the guiding arrangement or onto the at least a portion of the ITM, and wherein the control mechanism is adapted to control the fluid depositing arrangement such that fluid is deposited at a specific one of the plurality of pre-defined fluid depositing locations.

In some embodiments, the fluid deposited onto the guiding arrangement or onto the at least a portion of the ITM is adapted to reduce friction by reducing at least a local temperature of at least a portion of the ITM or of at least a portion of the guiding arrangement at a region of engagement between the ITM and the guiding arrangement. In some embodiments, the fluid is water. In some embodiments, the fluid is pressurized air.

In some embodiments, the fluid deposited onto the guiding arrangement or onto the at least a portion of the ITM is adapted to reduce friction by lubricating a contact area of the ITM and the guiding arrangement.

In some embodiments, the fluid includes an aqueous emulsion. In some embodiments, the emulsion includes at least 70% water, at least 75% water, at least 80% water, at least 85% water, at least 90% water, or at least 95% water. In some embodiments, the emulsion includes at most 30% lubricant, at most 25% lubricant, at most 20% lubricant, at most 15% lubricant, at most 10% lubricant, or at most 5% lubricant. In some embodiments, the emulsion includes 80% water and 10% lubricant. In some embodiments, the lubricant includes pure silicone.

In some embodiments, the lubricant does not detrimentally affect printing quality or characteristics of the ITM.

In some embodiments, the ITM includes a seam, and, under fixed testing conditions, a force at which seam failure occurs, following deposition onto the ITM of the lubricant at a rate of 10 cc of fluid per hour for a duration of 72 hours, is smaller than a force at which seam failure occurs prior to deposition of the lubricant, by at most 30%, at most 25%, at most 20%, at most 15%, at most 10%, or at most 5%.

In some embodiments, the ITM includes a pair of laterally extending guiding formations along lateral edges of the ITM, which guiding formations extend through the guiding arrangement.

In some embodiments, under fixed testing conditions, a peeling force at which failure occurs between the guiding formations and the lateral edges of the ITM, following deposition onto the ITM of the lubricant at a rate of 10 cc per hour for a duration of 72 hours, is smaller than a peeling force at which such failure occurred prior to deposition of the lubricant by at most 35%, at most 30%, at most 25%, at most 20%, at most 15%, at most 10%, or at most 5%.

In some embodiments, under fixed testing conditions, a spring constant of the guiding formations measured following deposition onto the ITM of the lubricant at a rate of 10 cc per hour for a duration of 72 hours, differs from a spring constant of the guiding formations measured prior to deposition of the lubricant by at most 15%, at most 10%, or at most 5%.

In some embodiments, the lubricant is further adapted to clean the guiding arrangement.

In some embodiments, the lubricant is chemically stable at a temperature at which the fluid is stored in the printing system. In some embodiments, the lubricant is chemically stable at least at a temperature in the range of 5 to 40 degrees Celsius.

In some embodiments, the fluid depositing arrangement includes a first fluid depositing nozzle disposed at a first location on a first side of the guiding arrangement, and a second fluid depositing nozzle disposed at a second location on a second side of the guiding arrangement, the first and second fluid depositing nozzles being functionally associated with the control mechanism. In some embodiments, the second location is substantially parallel to the first location.

In some embodiments, the fluid depositing arrangement is disposed adjacent the image forming station.

In some embodiments, the friction reduction system further includes a pumping arrangement, in fluid flow communication with the fluid reservoir and the fluid depositing arrangement, the pumping arrangement adapted to pump fluid from the reservoir to the fluid depositing arrangement.

There is further provided, in accordance with an embodiment of a third aspect of the invention, a method of reducing friction between an intermediate transfer member (ITM) of a printing system and a guiding arrangement through which the ITM is guided along the printing system, the method including:

depositing a fluid from a fluid deposition system, onto the guiding arrangement or onto at least a portion of the ITM, at or adjacent a contact area between the guiding arrangement and the ITM, thereby to reduce friction between the ITM and the guiding arrangement.

In some embodiments, the depositing includes continuously depositing the fluid. In some embodiments, the continuously depositing includes continuously depositing the fluid at a fixed continuous fluid deposition rate. In some embodiments, the fixed continuous fluid deposition rate is in the range of 1 ml to 50 ml, per hour.

In some embodiments, depositing includes periodically depositing the fluid. In some embodiments, the periodically depositing includes depositing a fixed volume of the fluid at least every 5 minutes, at least every 10 minutes, at least every 15 minutes, at least every 30 minutes, or at least every 45 minutes. In some embodiments, the fixed volume is in the range of 1 ml to 50 ml.

In some embodiments, the depositing includes intermittently depositing the fluid.

In some embodiments, intermittently depositing includes identifying an increase in friction between the ITM and the guiding arrangement and depositing a volume of the fluid in response to the identifying the increase in friction. In some embodiments, the identifying the increase in friction includes identifying an increase in electrical current in the printing system.

In some embodiments, the intermittently depositing includes identifying at least a local increase in temperature of the ITM or of the guiding arrangement at the contact area and depositing a volume of the fluid in response to the identifying the increase in temperature.

In some embodiments, the volume is in the range of 1 ml to 50 ml.

In some embodiments, intermittently depositing includes receiving, via a user interface of the printing system, a user instruction, and depositing a volume of the fluid in response to the receiving the user instruction.

In some embodiments, the fluid depositing arrangement includes a plurality of pre-defined fluid depositing locations at which fluid can be deposited onto the guiding arrangement or onto the at least a portion of the ITM, and wherein the depositing the fluid includes controlling the fluid depositing arrangement to deposit the fluid at a specific one of the plurality of pre-defined fluid depositing locations.

In some embodiments, the depositing the fluid includes reducing at least a local temperature of at least a portion of the ITM or of at least a portion of the guiding arrangement at the contact area. In some embodiments, the fluid is water. In some embodiments, the fluid is pressurized air.

In some embodiments, the depositing the fluid includes lubricating a contact area of the ITM and the guiding arrangement.

In some embodiments, the fluid includes an aqueous emulsion. In some embodiments, the emulsion includes at least 70% water, at least 75% water, at least 80% water, at least 85% water, at least 90% water, or at least 95% water. In some embodiments, the emulsion includes at most 30% lubricant, at most 25% lubricant, at most 20% lubricant, at most 15% lubricant, at most 10% lubricant, or at most 5% lubricant. In some embodiments, the emulsion includes 80% water and 10% lubricant. In some embodiments, the lubricant includes pure silicone.

In some embodiments, the depositing the fluid further includes cleaning the guiding arrangement.

In some embodiments, the lubricant is chemically stable at a temperature at which the fluid is stored in the printing system. In some embodiments, the lubricant is chemically stable at least at a temperature in the range of 5 to 40 degrees Celsius.

There is further provided, in accordance with an embodiment of a fourth aspect of the invention, a method of printing an image onto a substrate in a printing system including an intermediate transfer member (ITM) guided by a guiding arrangement between a printing station and an impression station, the method including:

- ink-jet printing an image onto a surface of the ITM;
- rotating the ITM to move the image from the printing station to the impression station;
- transferring the image from the surface of the ITM onto the substrate; and
- during at least one of the printing, the rotating, and the transferring, reducing friction between the ITM and the guiding arrangement according to the method described herein.

BRIEF DESCRIPTION OF THE DRAWINGS

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
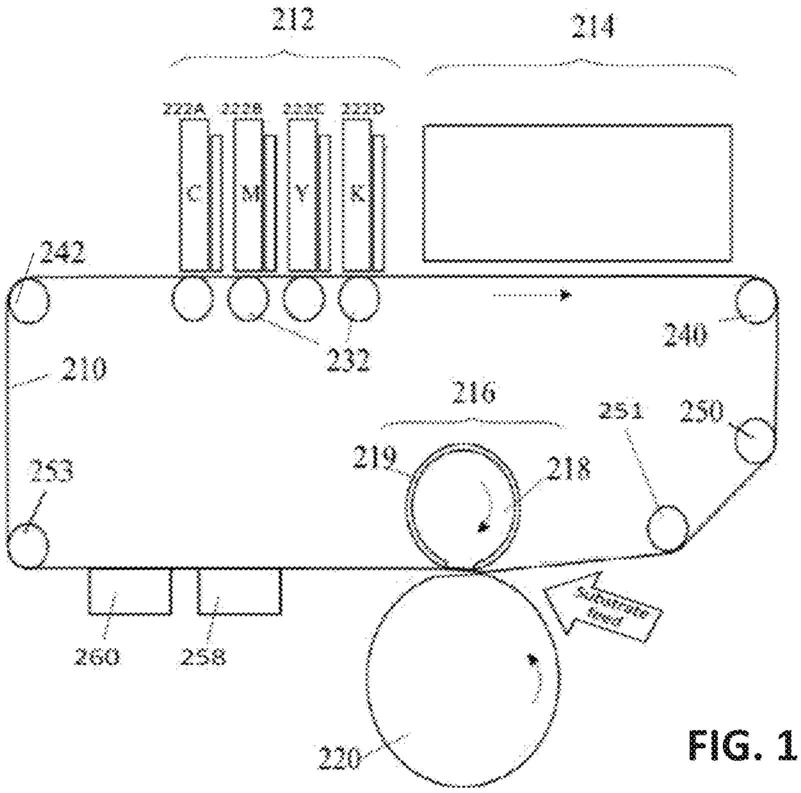
FIG. 1 is a schematic illustration of a printing system.

The invention, in some embodiments, relates to a friction reduction system for reducing friction of an ITM of a printing system, while the ITM is guided along the printing system by a guiding arrangement.

The invention, in some embodiments, relates to a printing system including a friction reduction system for reducing friction between the ITM of the printing system and the guiding arrangement through which the ITM is guided.

The invention, in some embodiments, relates to a method for reducing friction between an ITM in a printing system and a guiding arrangement through which the ITM is guided along the printing system In many currently used printing systems, the ITM is guided through a guiding arrangement. While the system is printing, the temperature of the ITM increases, and thus the friction between the ITM and the guiding arrangement also increases, which in turn results in a further increase in temperature. The increase in temperature and friction between the ITM and guiding arrangement may put excessive strain on the printing system, and in some cases may also impact the quality of image transfer from the ITM to the substrate, and as a result the quality of printing.

The present invention solves the deficiencies of the prior art by providing friction reducing system which reduces the friction between the ITM and the guiding arrangement while the printing system is working, without adversely affecting the image release or the quality of printing.

The principles, uses and implementations of the teachings herein may be better understood with reference to the accompanying description and figures. Upon perusal of the description and figures present herein, one skilled in the art is able to implement the invention without undue effort or experimentation. In the figures, like reference numerals refer to like parts throughout.

Before explaining at least one embodiment in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purposes and should not be regarded as limiting.

Additional objects, features and advantages of the invention will be set forth in the detailed description which follows, and in part will be readily apparent to those skilled in the art from the description or recognized by practicing the invention as described in the written description and claims hereof, as well as the appended drawings. Various features and sub-combinations of embodiments of the invention may be employed without reference to other features and sub-combinations.

It is to be understood that both the foregoing general description and the following detailed description, including the materials, methods and examples, are merely exemplary of the invention, and are intended to provide an overview or framework to understanding the nature and character of the invention as it is claimed, and are not intended to be necessarily limiting.

In the context of the description and claims herein, the terms "seam", "belt seam", and "blanket seam" may be used interchangeably and relate to a material or substance used to connect first and second free ends of an elongate belt to one another, thereby to form a continuous loop, or endless belt, usable as an ITM.

In the context of the description and claims herein, the terms "blanket" and "belt" are used interchangeably and relate to a surface suitable for use as a printing surface in a printing system, such as for use as an ITM.

In the context of the description and claims herein, the term "periodically" relates to an action that is carried out at regular intervals, or substantially regular intervals, such as, for example, once every 10 minutes, once every 30 minutes, once every hour, once every 3 hours, once every six hours, once every 12 hours, once every day, once every week, or once every month.

In the context of the description and claims herein, the term "intermittently" relates to an action that is carried out at various times, without there being any well-defined or regular duration between any two adjacent occurrences of the action.

In the context of the description and claims herein, the term "chemically stable" relates to a material that, under the specified conditions, is thermodynamically stable without phase separation and without carrying out side chemical reaction with other substances in its environment.

In the context of the description and claims herein, the term "substantially" relates to a deviation of up to 10%, up to 8%, or up to 5% from the specified value or arrangement. Reference is now made to FIG. 1, which is a schematic illustration of a printing system that implements an indirect printing process.

The system 10 comprises an ITM (ITM) 210 comprising a flexible endless belt mounted over a plurality of guide rollers 232, 240, 250, 251, 253, and 242.

In the specification herein, the ITM may be referred to also as an elongate belt having ends connected by a seam, as an endless belt, or as a continuous loop belt.

In some embodiments, the belt of ITM 210 has a length of up to 20 meters, and typically, a length within a range of 5-20, 5-15, 5-12, or 7-12 meters. In some embodiments, the belt of ITM 210 has a width of up to 2.0 meters, and typically, within a range of 0.3-2.0, 0.75-2.0, 0.75-1.5, or 0.75-1.25 meters.

In some embodiments, the belt of ITM 210 has a thickness of up to 3000 μm, and typically, within a range of 200-3000, 200-1500, 300-1000, 300-800, 300-700, 100-3000, 50-3000, or 100-600 μm.

In the example of FIG. 1, the ITM 210 (i.e. belt thereof) moves in the clockwise direction. The direction of belt movement defines upstream and downstream directions. Rollers 242, 240 are respectively positioned upstream and downstream of an image forming station 212—thus, roller 242 may be referred to as a "upstream roller" while roller 240 may be referred to as a "downstream roller".

The system of FIG. 1 further includes:

(a) an image forming station 212 (e.g. comprising print bars 222A-222D, where each print bar comprises ink jet head(s)) configured to form ink images (not shown) upon a surface of the ITM 210 (e.g. by droplet deposition upon a dried treatment film).

(b) a drying station 214 for drying the ink images.

(c) an impression station 216 where the ink images are transferred from the surface of the ITM 210 to sheet or web substrate. In the particular non-limiting example of FIG. 1, impression station 216 comprises an impression cylinder 220 and a blanket cylinder 218 that carries a compressible blanket or belt 219. In some embodiments, a heater 231 may be provided shortly prior to the nip between the two cylinders 218 and 220 of the image transfer station to assist in rendering the ink film tacky, so as to facilitate transfer to the substrate (e.g. sheet substrate or web substrate). The substrate feed is illustrated schematically.

(d) a cleaning station 258 where the surface of the ITM 210 is cleaned.

(e) a treatment station 260 (i.e. in FIG. 1 illustrated schematically as a block) where a layer (e.g. of uniform thickness) of liquid treatment formulation (e.g. aqueous treatment formulation) on the ITM surface can be formed.

The skilled artisan will appreciate that not every component illustrated in FIG. 1 is required.

Exemplary descriptions of printing systems are disclosed in Applicant's PCT Publications No. WO 2013/132418 and No. WO 2017/208152.

The primary purpose of the belt is to receive an ink image from the inkjet heads and to transfer that image dried but undisturbed to the substrate at the impression stations 216. Though not illustrated in the Figures, the belt forming the ITM may have multiple layers to impart desired properties to the transfer member. Specifically, the belt may include a release layer, which is an outer layer of the receiving the ink image and having suitable release properties.

Non-limiting examples of release layers and ITMs are disclosed in the Applicant's PCT Publications No. WO 2013/132432, No. WO 2013/132438 and No. WO 2017/208144.

In some printing systems, the ITM may be optionally treated at the treatment station 260 to further increase the interaction of the compatible ink with the ITM, or further facilitate the release of the dried ink image to the substrate, or provide for a desired printing effect.

Exemplary description of the treatment fluid is disclosed in Applicant's PCT Application Publication No. WO 2017/208246.

Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

In the non-limiting example of FIG. 1 the printing system cannot achieve duplex printing but it is possible to provide a perfecting system to reverse substrate sheets and pass them a second time through the same nip. As a further alternative, the printing system may comprise a second impression station for transferring an ink image to opposite sides of the substrates.

Figure 2A:
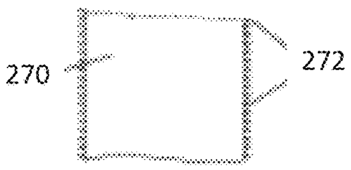
FIGS. 2A and 2B are, respectively, a top view planar illustration of an exemplary portion of an ITM and a perspective illustration of a corresponding exemplary guiding arrangement, which may form part of the printing system of FIG. 1.

Reference is now made to FIG. 2A, which shows a portion of a belt 270, suitable for forming an ITM such as ITM 210 of FIG. 1, having lateral formations 272 formed on lateral sides thereof. Lateral formations 272 may be used for threading belt 270 through a printing system, such as printing system 10 (FIG. 1) to form an endless belt of an ITM, such as ITM 210 (FIG. 1), and for guiding the ITM through corresponding lateral channels of a guiding arrangement along the printing system during the printing process.

The lateral formations 272 may be spaced projections, such as the teeth of one half of a zip fastener sewn or otherwise attached to each side edge of the belt 270, as shown in the embodiment of FIG. 2A. Such lateral formations need not be regularly spaced.

Alternatively, the formations may be a continuous flexible bead of greater thickness than the belt 270. The lateral formations 272 may be directly attached to the edges of the belt 270 or ay be attached through an intermediate strip that can optionally provide suitable elasticity to engage the formations in corresponding lateral channels of a guiding arrangement, described and illustrated hereinbelow with reference to FIG. 2B, while maintaining the ITM 210 flat, in particular at the image forming station 212 (FIG. 1) of the printing system.

The lateral formations 272 may be made of any material able to sustain the operating conditions of the printing system, including the rapid motion of the ITM. Suitable materials can resist elevated temperatures in the range of about 50° C. to 250° C. Advantageously, such materials do not yield debris of size and/or amount that would negatively affect the movement of the belt during its operative lifespan. For example, the lateral formations 272 can be made of polyamide reinforced with molybdenum disulfide.

Further details on exemplary belt lateral formations according to the present invention are disclosed in PCT Publications Nos. WO 2013/136220 and WO 2013/132418.

Figure 2B:
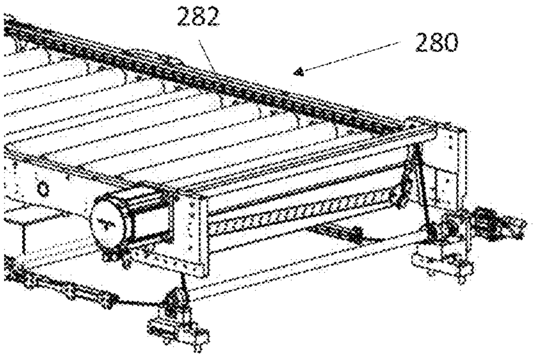

Reference is now made to FIG. 2B, which is a perspective view of an exemplary guiding arrangement 280, which may form part of a printing system, such as printing system 10 of FIG. 1.

The guiding arrangement 280 comprises a pair of continuous lateral tracks, each defining a guiding channel 282 that can engage lateral formations 272 on one of the lateral edges of the belt, as illustrated in FIG. 2A, to maintain the belt taut in its width ways direction during threading and use thereof. The guiding channel 282 may have any cross-section suitable to receive and retain the belt lateral formations 272 and maintain the belt taut.

Further details on exemplary belt lateral formations and on guide channels suitable for receiving such lateral formations, are disclosed in PCT Publication Nos. WO 2013/136220 and WO 2013/132418.

Figure 3:
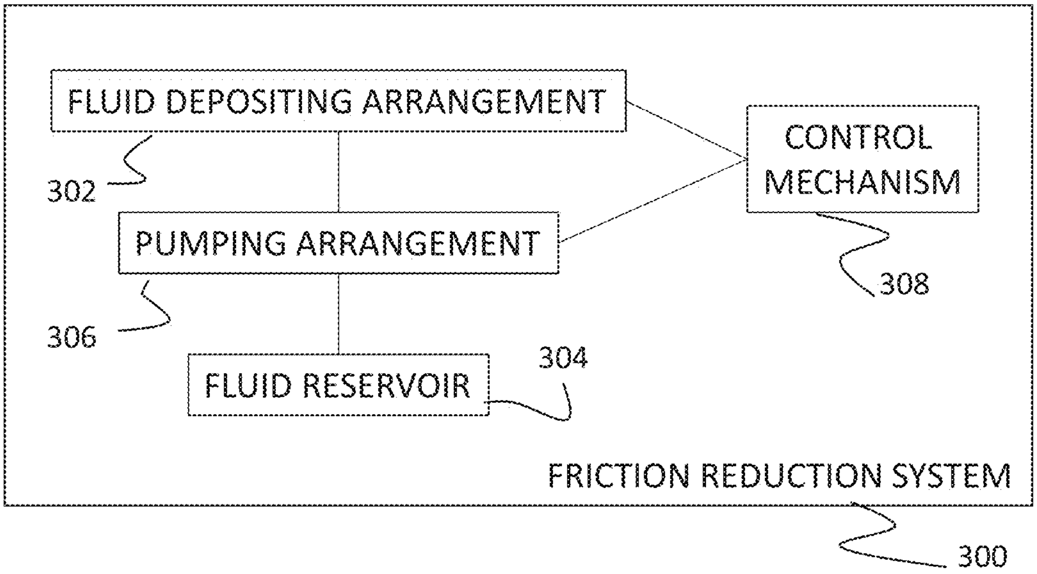
FIG. 3 is a schematic block diagram of a friction reduction system in accordance with an embodiment of the present invention.

Reference is now made to FIG. 3, which is a schematic block diagram of a friction reduction system 300, usable in a printing system such as printing system 10 of FIG. 1, in accordance with an embodiment of the present invention.

The friction reduction system 300 includes a fluid depositing arrangement 302, in fluid flow communication with a fluid reservoir 304, which is mounted at any suitable location within printing system 10. As described in further detail hereinbelow with respect to FIG. 4, the fluid depositing arrangement is disposed within printing system 10, such that fluid may be deposited thereby onto the guiding arrangement guiding the ITM, such as guiding channels 282 of FIG. 2B, or onto a portion of the ITM 210, such as the lateral formations 272 thereof (FIG. 2A) or any other portion thereof which contact the guiding arrangement.

Fluid may be pumped from fluid reservoir 304 to fluid depositing arrangement 302 by a pumping arrangement 306, which may be disposed at any suitable location within the printing system. Fluid reservoir 304 may be disposed in any suitable position or location within printing system 10, provided that it does not disrupt operating of the printing system, and that fluid may be pumped effectively to fluid depositing arrangement 302.

A control mechanism 308 is adapted to control operation of fluid depositing arrangement 302 and of pumping arrangement 306, so as to control depositing of fluid onto the guiding arrangement or onto the ITM. As explained in further detail hereinbelow, depositing of fluid onto the guiding arrangement or onto the ITM, at a contact area thereof, results in reduction of the friction between the guiding arrangement and the ITM.

Figure 4:
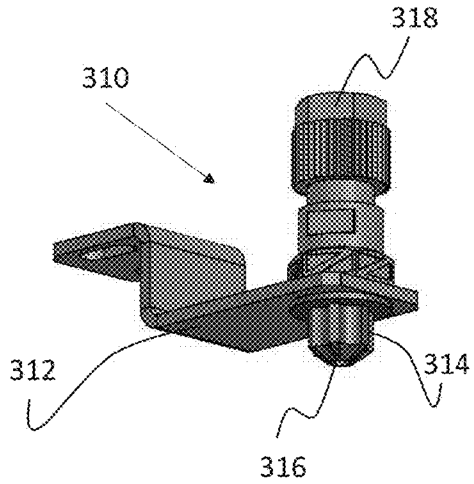
FIG. 4 is a perspective view illustration of a fluid depositing nozzle, forming part of a fluid depositing arrangement in accordance with an embodiment of the present invention.
Figure 5:
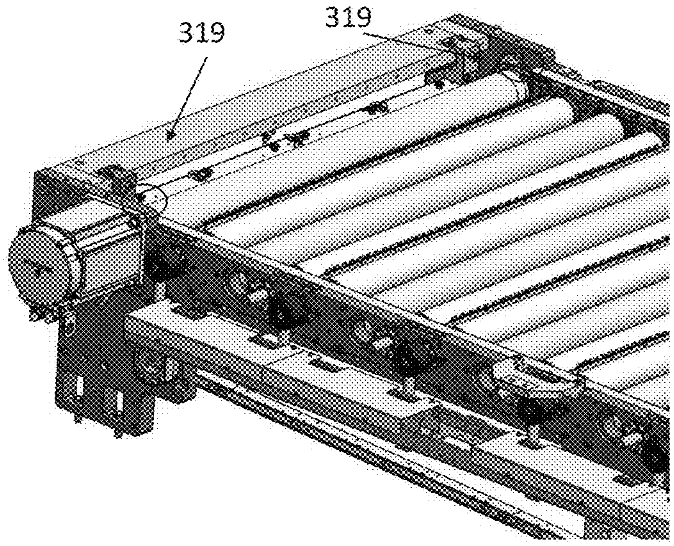
FIG. 5 is a perspective view illustration of a location of a fluid depositing arrangement forming part of a friction reduction system in accordance with an embodiment of the present invention.

Reference is now additionally made to FIG. 4, which is a perspective view illustration of a fluid depositing nozzle 310, forming part of a fluid depositing arrangement 302, and to FIG. 5, which is a perspective view illustration of a location of fluid depositing arrangement 302.

As seen in FIG. 4, in some embodiments fluid depositing arrangement 302 may include one or more fluid depositing nozzles 310, each in fluid flow communication with fluid reservoir 304 and suitable for depositing fluid therefrom. In some embodiments, fluid depositing arrangement may include at least two fluid depositing nozzles 310, one disposed adjacent each of guiding channels 282 and/or adjacent each of the two lateral edges of ITM 210.

Each fluid depositing nozzle 310 includes an anchoring arrangement 312 for anchoring the nozzle to printing system 10, a dripping tip 314 having a bore 316 sized and dimensioned for depositing fluid onto the ITM and/or the guiding arrangement, and an inlet portion 318 in fluid flow communication with fluid reservoir 304.

The dimensions of bore 316 may be suited to the specific type of fluid being deposited from nozzle 310, or to a depositing rate. For example, bore 316 may be larger if the fluid being deposited is a viscous emulsion, and may be smaller if the fluid being deposited is water. In some embodiments, bore 316 has a diameter in the range of 0.75 mm to 1.25 mm, preferably a diameter of 1 mm.

As seen in FIG. 5, in some embodiments, the fluid depositing arrangement 302, and more specifically fluid depositing nozzles 310, may be located adjacent, or above, each of lateral guiding channels 282, so as to deposit fluid onto the channels 282 or onto ITM 210 at an area which comes into contact with guiding channels 282. In some embodiments, the location of the two nozzles, on opposing sides of ITM 210, are substantially parallel to one another, as indicated by arrows 319 in FIG. 5.

In some embodiments, the fluid depositing arrangement 302 or fluid depositing nozzles 310 are located adjacent the image forming station of the printing system (e.g. image forming station 212 of FIG. 1). Such positioning of the fluid depositing nozzles 310 is advantageous due to the fact that, due to the high working temperature of the printing system, which may be 150° C., aqueous component of the deposited fluid evaporates prior to arriving at the impression station (e.g. impression station 216 of FIG. 1) such that the fluid does not degrade the quality of the printed image. It is appreciated that any other location of the nozzles 310, enabling evaporation of an aqueous component of the deposited fluid prior to arriving at the impression station, would be similarly advantageous.

In some embodiments, nozzles 310 may be located at other location, or in additional locations. For example, additional nozzles may be required if the deposited fluid evaporates rapidly, or if deposition of fluid at a single point along the path of ITM 210 in printing system 10 is insufficient for preventing an increase in friction between the ITM and the guiding channels 282.

Figure 6:
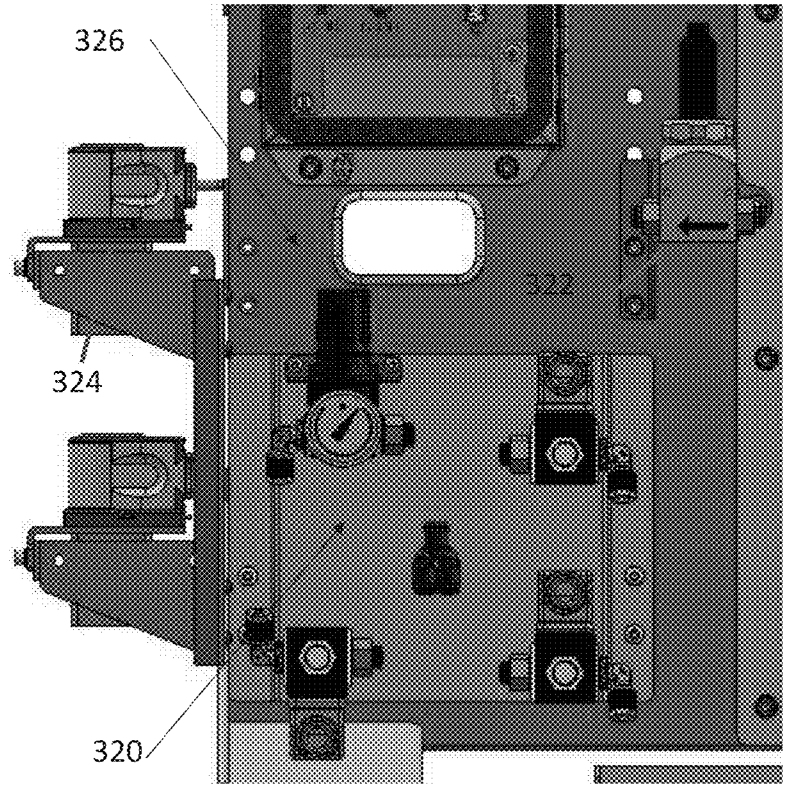
FIG. 6 is a perspective view illustration of a portion of a control mechanism forming part of a friction reduction system in accordance with an embodiment of the present invention.

Reference is now made to FIG. 6, which is a perspective view illustration of a portion of control mechanism 308 of friction reduction system 300 in accordance with an embodiment of the present invention. As seen in FIG. 6, control mechanism 308 may form part of a general control panel or logic panel of printing system 10, and may include a logic circuit 320, which may be part of a printed circuit board, and a flow meter 322 for controlling the flow of fluid from fluid depositing arrangement 302. One or more pumps 324, which may form part of pumping arrangement 306, may also be mounted onto control mechanism 308 or onto a control panel 326 of system 10, as illustrated in FIG. 6.

In some embodiments, the control mechanism 308 may include a dedicated processor (CPU). In other embodiments, the control mechanism 308 may run using the central processor of printing system 10. In some embodiments, the control mechanism 308 may include a dedicated memory component storing instructions to be executed by the processor. In other embodiments, the instructions to be carried out by the processor of control mechanism 308 may be stored on a central memory component of printing system 10. The printed circuit board associated with control mechanism 308 may be placed at any suitable location, for example the location illustrated in FIG. 6.

In use, fluid is deposited from fluid depositing arrangement 302 onto the guiding channels 282 (or other guiding arrangement) or onto a portion of ITM 210, for example, a portion thereof which comes into contact with the guiding arrangement, so as to reduce friction between said ITM and said guiding arrangement.

In some embodiments, the control mechanism 308 may control fluid depositing arrangement 302, such that the fluid is continuously deposited onto the ITM 210 and/or the guiding arrangement 280. In some embodiments, the fluid is continuously deposited at a fixed continuous fluid deposition rate, which may, for example, be in the range of 1 ml to 50 ml per hour. It will be appreciated that a fixed fluid deposition rate may be different for different types of fluids, for example due to different viscosities.

In some embodiments, the control mechanism 308 may control fluid depositing arrangement 302, such that the fluid is periodically deposited onto the ITM 210 and/or the guiding arrangement 280. In some embodiments, a fixed volume of the fluid is deposited at fixed intervals, for example at least once every 5 minutes, at least once every 10 minutes, at least once every 15 minutes, at least once every 30 minutes, or at least once every 45 minutes.

In some such embodiments, the fixed volume may be in the range of 1 ml to 50 ml. It will be appreciated that the fixed volume, and/or the fixed time interval, may be different for different types of fluids, for example due to different viscosities or to different lubricating characteristics.

In some embodiments, the control mechanism 308 may control fluid depositing arrangement 302, such that the fluid is intermittently deposited onto the ITM 210 and/or the guiding arrangement 280.

For example, the control mechanism 308 may identify an increase in friction between ITM 210 and guiding arrangement 280, such as identifying that such friction exceeds a pre-defined friction threshold. In response, the control mechanism may control fluid depositing arrangement 302 to deposit a volume of fluid into the ITM and/or guiding arrangement so as to lower the friction to be below the friction threshold. The degree of friction between the ITM and guiding arrangement may be tracked or monitored using any suitable method or technique. In some embodiments, the degree of friction is monitored by monitoring the electrical current in the printing system, where an increase in the electrical current corresponds to an increase in friction, as explained hereinbelow with respect to Example 1.

As another example, the control mechanism 308 may identify an increase in temperature of ITM 210 and/or of guiding arrangement 280, and in response, may control fluid depositing arrangement 302 to deposit a volume of fluid onto the guiding arrangement and/or the ITM. In some embodiments, in order to trigger depositing of fluid, the increase in temperature (i.e. the difference in temperature from a previous measurement to the current measurement) must be greater than a pre-defined increase threshold. In some embodiments, in order to trigger depositing of fluid, a temperature of the ITM or of the guiding arrangement must exceed a pre-defined temperature threshold. In some embodiments, the temperature measurement, or temperature increase measurement, is carried out at a specific temperature measurement region, which may be, for example, in a portion of the ITM which comes into contact with the guiding arrangement, or in a portion of the guiding arrangement which comes into contact with the ITM.

In some embodiments, control mechanism may trigger fluid depositing arrangement 302 to deposit fluid only following identification of a continuous increase in temperature of the ITM and/or of the guiding arrangement for a predefined duration.

As a further example, the control mechanism 308 may be functionally associated with a user interface of printing system 10 (not explicitly illustrated), and may receive from the user interface a user instruction causing the control mechanism to control fluid depositing arrangement 302 to deposit a volume of fluid onto the guiding arrangement and/or the ITM.

The volume of fluid deposited by fluid depositing arrangement 302 at each such intermittent depositing occurrence may be fixed, or may vary between different depositing occurrences. For example, a different volume of fluid may be used in response to receipt of a user instruction, than in response to identification of an increase in temperature or in friction. As another example, the volume of fluid deposited may be correlated to the degree of increase in temperature or in friction identified by control mechanism 308, such that identification of a greater increase in temperature or friction would result in deposition of a larger volume of fluid. In some embodiments, the volume of fluid deposited at each fluid depositing occurrence is in the range of 1 ml to 50 ml.

As described hereinabove with respect to FIGS. 4 and 5, in some embodiments, the fluid depositing arrangement 302 may include a plurality of fluid depositing locations, or fluid depositing nozzles, disposed at different locations along the guiding arrangement. In some such embodiments, when fluid is deposited onto ITM 210 and/or onto guiding arrangement 280, control mechanism 308 controls the fluid depositing arrangement 302 to deposit fluid in specific ones of the fluid depositing locations. As such, fluid may be deposited at all the fluid depositing locations simultaneously, or only at a subset of the fluid depositing locations at any specific time.

In some embodiments, the deposited fluid lubricates ITM 210 and/or onto guiding arrangement 280, which results in reduction of friction therebetween.

In some embodiments, as a result of deposition of fluid onto ITM 210 and/or onto guiding arrangement 280, at least the local temperature of at least a portion of the ITM and/or at least a portion of the guiding arrangement is decreased. As explained hereinabove, a reduction in temperature, results in a corresponding reduction of friction in the system. In this context, the term "local temperature" relates to the temperature at the point of contact between a portion of the ITM and a portion of the guiding arrangement in which the portion of the ITM is located. In some such embodiments, the portion of the ITM and/or the portion of the guiding arrangement may be portions at which the guiding arrangement and ITM engage one another.

The deposited fluid may be any suitable fluid.

In some embodiments, the deposited fluid is water. In some embodiments, the deposited fluid is pressurized air. In such embodiments, the deposition of fluid results in reduction of temperature as explained above, which in turn results in reduction of friction. Due to the fact that waster and/or pressurized air function by reduction of temperature, and that such reduction of temperature does not persist for an extended duration, and/or does not substantially occur in areas onto which no fluid was directly deposited, continuous depositing of fluid is more suitable and effective when using these types of fluids.

In some embodiments, the fluid is a lubricating fluid, which lubricates the contact area between the ITM and the guiding arrangement so as to reduce friction therebetween. For example, the lubricating fluid may comprise an aqueous emulsion. In such embodiments, periodic deposition of fluid is suitable, since the lubricating component of the emulsion remains in the guiding arrangement between deposition occurrences, and is spread along the ITM and the guiding arrangement also to areas where it was not directly deposited.

The emulsion may have any suitable ratio between lubricating components and aqueous components. In some embodiments, the emulsion comprises at least 70% water, at least 75% water, at least 80% water, at least 85% water, at least 90% water, or at least 95% water. In some embodiments, the emulsion comprises at most 30% lubricant, at most 25% lubricant, at most 20% lubricant, at most 15% lubricant, at most 10% lubricant, or at most 5% lubricant. In some embodiments, the emulsion comprises 90% water and 10% lubricant.

In some embodiments, the lubricant included in the emulsion is pure silicone.

In some embodiments, the deposited fluid also functions to clean the guiding arrangement. As shown in Example 2 below, an emulsion including pure silicone serves to clean the guiding channels 282 while lubricating the guiding channels and reducing friction between the guiding channels and the ITM.

The fluid used to reduce friction in printing system 10, and in the case of an emulsion also specifically the lubricant included therein, must be suitable to the functionality of the printing system.

As such, the selected fluid is chemically stable at a temperature at which the fluid is stored in printing system 10, which is a temperature in the range of 5 to 40 degrees Celsius.

In some embodiments, the selected fluid does not detrimentally affect printing quality or image transfer from the surface of the ITM to the substrate. Specifically, the selected fluid, or a lubricant contained therein, does not affect the wettability of the printing ink, or the tackiness during release of the ink from the ITM and image transfer.

In some embodiments, the selected fluid does not detrimentally affect characteristics of the ITM.

For example, in some embodiments in which the ITM includes a seam connecting opposing ends of an elongate flexible blanket to form the ITM, the selected fluid does not detrimentally affect the strength of the seam. For the purposes of this application, a fluid is considered to not detrimentally affect the strength of the seam if, under the same testing conditions, the force at which seam failure occurs, following use of the fluid at a rate of 10 cc of fluid deposited onto the ITM once every hour for a duration of 72 hours, is smaller than the force at which seam failure occurred prior to application of the fluid by at most 30%, at most 25%, at most 20%, at most 15%, at most 10%, or at most 5%.

As another example, in some embodiments in which the ITM includes lateral formations 272, as described hereinabove with respect to FIG. 2A, the selected fluid does not detrimentally affect the strength of a connection between the lateral formations and lateral edges of the ITM. For the purposes of this application, a fluid is considered to detrimentally affect the strength of the connection between the lateral formations and the lateral edges of the ITM if, under the same testing conditions, the peeling force at which failure occurs between the lateral formations and the lateral edges of the ITM, following use of the fluid at a rate of 10 cc of fluid deposited onto the ITM once every hour for a duration of 72 hours, is smaller than the peeling force at which such failure occurred prior to application of the fluid by at most 35%, at most 30%, at most 25%, at most 20%, at most 15%, at most 10%, or at most 5%.

As a further example, in some embodiments in which the ITM includes lateral formations 272, as described hereinabove with respect to FIG. 2A, the selected fluid does not detrimentally affect the spring constant of the lateral formations. For the purposes of this application, a fluid is considered to detrimentally affect the spring constant the lateral formations if, under the same testing conditions, the spring constant of the lateral formations measured following use of the fluid at a rate of 10 cc of fluid deposited onto the ITM once every hour for a duration of 72 hours, differs from the spring constant measured prior to application of the fluid by at most 15%, at most 10%, or at most 5%.

As yet another example, in some embodiments in which the ITM includes lateral formations 272, as described hereinabove with respect to FIG. 2A, the selected fluid does not substantially discolor the lateral formations. When printing system 10 is in use for printing an image onto a substrate, at printing station 212 (FIG. 1), an image is ink-jet printed a surface of ITM 210. The ITM is then rotated to move the printing image from the printing station to the impression station 216 (FIG. 1). At the impression station, the image is transferred from the surface of the ITM onto the substrate, as explained hereinabove. During one or more of the actions of printing the image, rotating the ITM, and transferring the image, friction between the ITM 210 and guiding arrangement 240 (FIG. 2B) is reduced by deposition of fluid onto the ITM or the guiding arrangement, as described hereinabove.

EXAMPLES

Reference is now made to the following examples, which together with the above description, illustrate the invention in a non-limiting fashion.

Example 1

Application of Emulsion Lowers Currents in the System

A printing system was operated to print images, while tracking the currents in the system approximately once every 2-3 minutes, on either side of the ITM of the system. After approximately 30 minutes of operation, 10 cc of an emulsion were deposited onto each of the guiding tracks of the printing system, adjacent the ITM. The emulsion was an aqueous emulsion, including 80% water and 10% liquid silicone in the form of PMX200, commercially available from Dow Corning of Midland, Michigan, USA. Following deposition of the emulsion, the currents on either side of the ITM were measured for an additional duration of approximately three hours, with no additional application of the emulsion or any other fluid. The currents measured in the system are illustrated in FIG. 7, in which the currents measured on one side of the ITM are indicated in purple, and the currents measured on the other side of the ITM are indicated in green.

Figure 7:
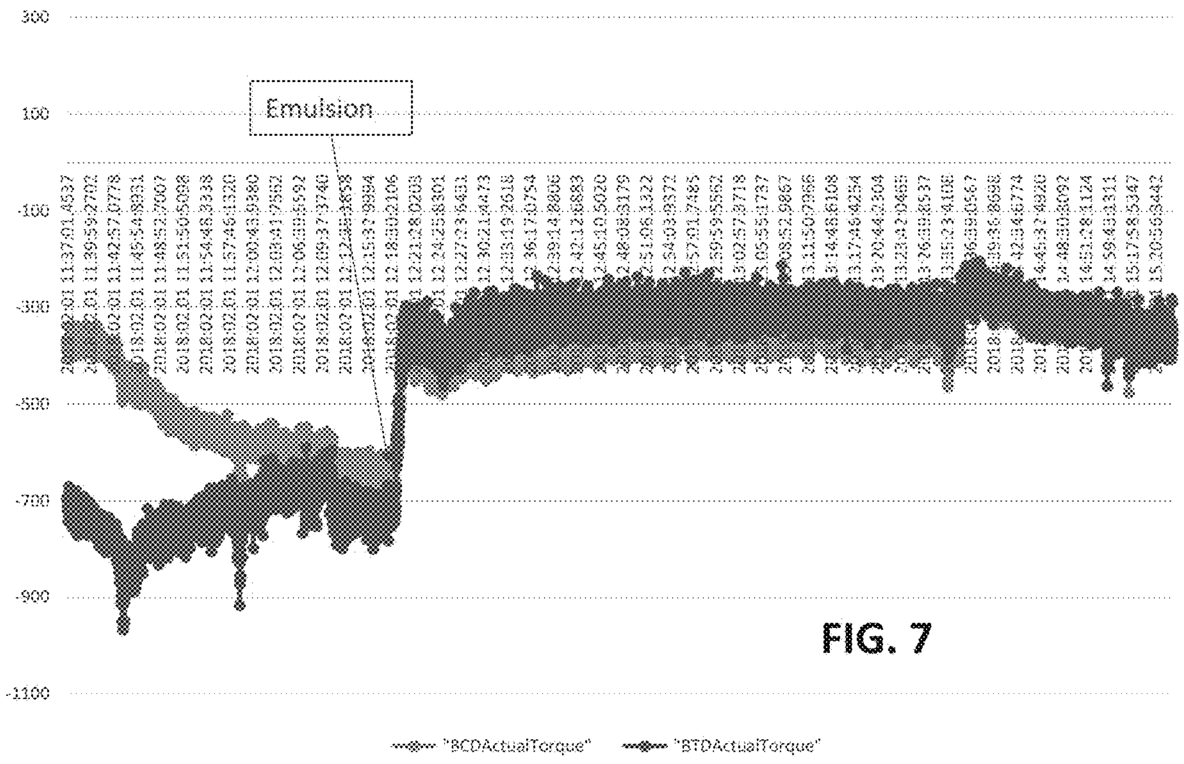
FIG. 7 is a graph indicating the impact to friction between the ITM and the guiding arrangement when an emulsion is deposited onto the guiding arrangement, using the system and method of the present invention.

In FIG. 7, the x-axis represents time, and the y-axis represents Torque, such that a lower absolute value along the y-axis is indicative of lower current in the system, and a higher absolute value is indicative of a higher current in the system.

As seen, in the initial 40 minutes of operation of the system, the currents increase—in the purple graph, or remain, on average, fixed—in the green graph. Upon deposition of the emulsion, the currents in the system almost immediately decrease by approximately 400 Nm, thereby indicating a significant reduction of friction between the ITM and the guiding channels. As seen, following deposition of the emulsion and the reduction in the currents in the system, the current stay substantially constant for the remainder of the experiment.

As such, the graph of FIG. 7 clearly demonstrates the effectiveness of a liquid silicone emulsion in reducing the friction between the ITM and the guiding tracks, for an extended duration, while using small volumes of the emulsion.

Example 2

Emulsions for Reducing Friction, as Cleaners

Figure 8A:
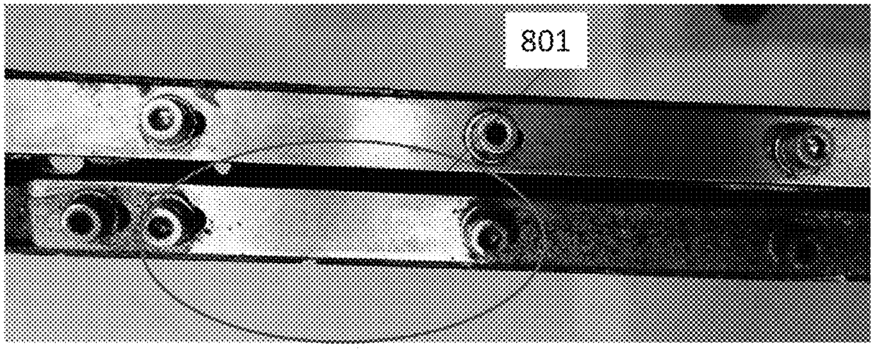
FIGS. 8A and 8B are photographs of a guiding channel in which a Polytetrafluoroethylene (PTFE) emulsion was used as the deposited fluid, and a guiding channel in which a silicone emulsion was used as the deposited fluid, respectively.

A dirty guiding track for an ITM in a printing system was cleaned using emulsions, which may also be used as lubricating fluids according to the present invention. A first segment of the guiding track was cleaned using an emulsion including 80% water and 10% liquid silicone in the form of PMX200, commercially available from Dow Corning of Midland, Michigan, USA. The first segment is shown in the photograph of FIG. 8A, circled by an oval 801. A second segment of the guiding track was cleaned using a Polytetrafluoroethylene (PTFE) spray, commercially available as a Teflon® spray from The Chemours Company of Willmington, Delaware, USA. The second segment is shown in the photograph of FIG. 8B, circled by an oval 802.

Figure 8B:
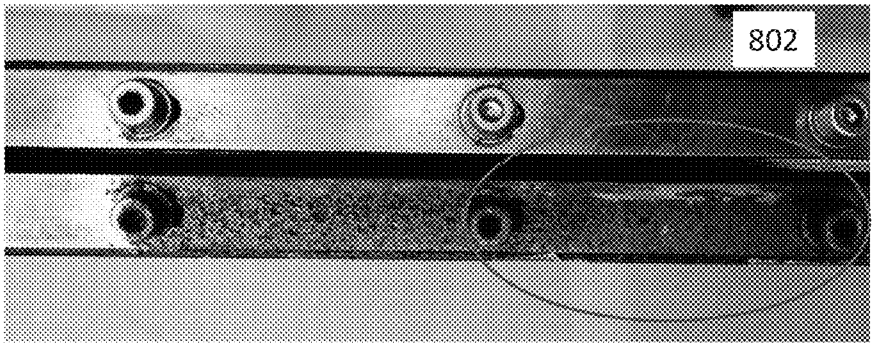

As seen from comparison of FIGS. 8A and 8B, the emulsion including PMX200 is a much more effective cleaner of the guiding track than the spray including Teflon®. Since, as shown in Example 1, an emulsion including PMX200 is an effective lubricant of the guiding track and the ITM, cleaning of the tracks during operation of the system is an added benefit that may occur when using, as the deposited fluid, an aqueous emulsion of PMX200.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

The invention claimed is:

1. A cleaning system for use with a printing system, said printing system comprising an intermediate transfer member (ITM) and a guiding arrangement of the printing system configured to guide the ITM, said printing system configured to (i) print images onto a surface of said ITM, (ii) rotate said ITM so as to move said printed images, and (iii) transfer said printed images from said ITM surface to substrate, the cleaning system comprising:

a fluid reservoir mounted within said printing system, said fluid reservoir configured to store a quantity of cleaning fluid;

a fluid depositing arrangement disposed at at least one position along the ITM; and a control mechanism, adapted to control depositing of cleaning fluid, from said fluid depositing arrangement onto said guiding arrangement or onto at least a portion of said ITM, such that said depositing of said cleaning fluid occurs during at least one of said printing, said rotation and said transferring.

2. The cleaning system of claim 1, wherein said control mechanism is adapted to control deposition of cleaning from said fluid depositing arrangement onto said ITM at a contact area between said ITM and said guiding arrangement.

3. The cleaning system of claim 1, wherein said control mechanism is adapted to control said fluid depositing arrangement such that said cleaning fluid is continuously deposited onto said guiding arrangement or onto said at least a portion of said ITM.

4. The cleaning system of claim 3, wherein said control mechanism is adapted to control said fluid depositing arrangement such that said cleaning fluid is continuously deposited at a fixed continuous fluid deposition rate.

5. The cleaning system of claim 1, wherein said control mechanism is adapted to control said fluid depositing arrangement such that said cleaning fluid is periodically deposited from said fluid depositing arrangement onto said guiding arrangement or onto said at least a portion of said ITM.

6. The cleaning system of claim 1, wherein said control mechanism is adapted to control said fluid depositing arrangement such that said cleaning fluid is intermittently deposited from said fluid depositing arrangement onto said guiding arrangement or onto said at least a portion of said ITM.

7. A printing system comprising:

an intermediate transfer member (ITM) formed as an endless belt;

an image forming station for printing an ink-image on an outer surface of said ITM;

an impression station at which an ink residue film, which is produced by drying of said ink image, is transferred to a substrate; and the cleaning system of claim 1.

8. The printing system of claim 7, wherein said fluid depositing arrangement is disposed adjacent said image forming station.

9. In a printing system comprising a printing station, an impression station, and an intermediate transfer member (ITM) guided by a guiding arrangement between the printing station and the impression station, a cleaning method comprising:

providing a fluid reservoir loaded with a quantity of cleaning fluid, said fluid reservoir being mounted within said printing system, concurrent with at least one activity of said printing system selected from the group consisting of (i) printing ink images onto a surface of said ITM, (ii) a rotating of said ITM so as to move said printed ink images, and (iii) transferring of said printed image from said ITM surface to substrate, cleaning said guiding arrangement by deposition of said cleaning fluid onto said guiding arrangement or onto an ITM-contacting surface that is in contact with said ITM.

10. The method of claim 9, wherein said cleaning fluid is an emulsion.

11. The method of claim 10, wherein said cleaning fluid includes silicone.

12. The method of claim 10, wherein said cleaning fluid includes pure silicone.

13. The cleaning system of claim 1 further comprising said cleaning fluid, wherein said cleaning fluid is an emulsion.

14. The cleaning system of claim 13, wherein said cleaning fluid includes silicone.

15. The cleaning system of claim 13, wherein said cleaning fluid includes pure silicone.

* * * * *